(12) United States Patent
Suda

(10) Patent No.: US 7,333,140 B2
(45) Date of Patent: Feb. 19, 2008

(54) IMAGE PICKUP APPARATUS CAPABLE OF RECORDING OBJECT INFORMATION

(75) Inventor: Hirofumi Suda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 758 days.

(21) Appl. No.: 10/745,320

(22) Filed: Dec. 22, 2003

(65) Prior Publication Data
US 2004/0135905 A1  Jul. 15, 2004

(30) Foreign Application Priority Data
Jan. 7, 2003 (JP) .............................. 2003-001373

(51) Int. Cl.
*H04N 5/76* (2006.01)
(52) U.S. Cl. .................................................. 348/231.3
(58) Field of Classification Search ............. 348/231.3, 348/231.5, 143
See application file for complete search history.

(56) References Cited

U.S. PATENT DOCUMENTS 6,397,334 B1 * 5/2002 Chainer et al. ............. 713/176
2002/0008622 A1 * 1/2002 Weston et al. ........... 340/572.1
2002/0070862 A1 * 6/2002 Francis et al. ........... 340/572.1
2002/0149681 A1 * 10/2002 Kahn et al. ............. 348/211.99
2003/0103149 A1 * 6/2003 Kinjo et al. ............. 348/231.5
2004/0100566 A1 * 5/2004 Valleriano et al. ...... 348/231.99
2004/0169587 A1 * 9/2004 Washington ............. 340/573.1
2004/0201738 A1 * 10/2004 Moores et al. ........... 348/231.2
2005/0052535 A1 * 3/2005 Hamadi .................. 348/207.11
2005/0093976 A1 * 5/2005 Valleriano et al. .......... 348/143
2007/0109099 A1 * 5/2007 Raphaeli et al. ......... 340/572.1

* cited by examiner

*Primary Examiner*—Lin Ye
*Assistant Examiner*—Jason Whipkey
(74) *Attorney, Agent, or Firm*—Cowan, Liebowitz & Latman, P.C.

(57) ABSTRACT

An image pickup apparatus having: an image pickup unit for picking up an image of an object; an information detection unit for detecting, in a contactless manner, object information regarding the object stored in a contactless ID tag; a recording unit for recording the object information detected by the information detection unit onto a recording medium together with image data of the object picked up by the image pickup unit; and a control unit for setting detecting conditions in the information detection unit in accordance with an image pickup condition in the image pickup unit.

8 Claims, 11 Drawing Sheets

IMAGE PICKUP APPARATUS CAPABLE OF RECORDING OBJECT INFORMATION

BACKGROUND OF THE INVENTION

1. Field of the Invention

The invention relates to an image pickup apparatus and, more particularly, to an image pickup apparatus which is suitable to be used for obtaining information regarding an object to be photographed.

2. Related Background Art

In recent video camera and digital camera, not only a video image is photographed, but a trial to realize a more advanced application by making use of a construction for recording the image as electronic data is also made.

For example, various information is added to image data. The information which is added to the image data is generally called "meta data". Information such as photographing state and characteristics of the camera, photographing date and time, type of the camera, and the like can be added as meta data.

The digital camera and the digital video camera are not used only in an application to photograph the video image, but various other applications have begun to be made. Photographing of goods can be mentioned as one of the applications. For example, when goods are sold via the Internet or the like, it is necessary to display an image of the goods onto a homepage in order to describe the goods.

Not only a person who makes a specialty of trading but also a general person often photographs the goods in order to exhibit the goods at an auction of the Internet.

It is demanded to easily add the information, as meta data, regarding the goods to the image data of the goods to be exhibited at the auction. As meta data in such a case, a manufacturing company and a kind of goods, a specific goods code, characteristics of the goods, and the like can be mentioned.

Also in the photographing of persons, the photographing of a landscape, and the like which have generally been performed hitherto, if meta data showing the type and characteristics of the photographed person or object can be added to the image data, a retrieval can be easily performed or the like, so that there is a possibility that a using range is further widened.

However, information regarding an object which is demanded to be added as meta data of the image data is not information existing in the camera. There is, consequently, a problem such that it is difficult to add the information regarding the object to the image data and record it upon photographing.

Therefore, a method whereby a photographer adds the information regarding the object to the image data by inputting the information regarding the object or the like after the photographing is considered.

A method whereby the photographer preliminarily and manually stores the information regarding the object into the camera and adds the stored information regarding the object upon photographing is also considered.

However, according to those methods, since the photographer needs to obtain the information regarding the object by himself and add it to the image data or store it into the camera, such a construction is very troublesome. Thus, it is not always practical.

SUMMARY OF THE INVENTION

It is an object of the invention to solve such problem.

Another object of the invention is to promptly and certainly add information regarding an object to image data obtained by photographing the object.

To accomplish the above objects, according to an embodiment of the invention, an image pickup apparatus comprises: image pickup means for picking up an image of an object; information detecting means for detecting, in a contactless manner, object information regarding the object stored in a contactless ID tag; recording means for recording the object information detected by the information detecting means onto a recording medium together with image data of the object picked up by the image pickup means; and control means for setting detecting conditions of the information detecting means in accordance with an image pickup condition of the image pickup means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

First Embodiment

The first embodiment of the invention will now be described with reference to the drawings. In the following description, an expression "image" denotes both or one of an image of a still image and an image of a motion image. The image is not limited by a compression system, a size of image data, and the like.

Construction of an Image Pickup Apparatus and an Object

Figure 1:
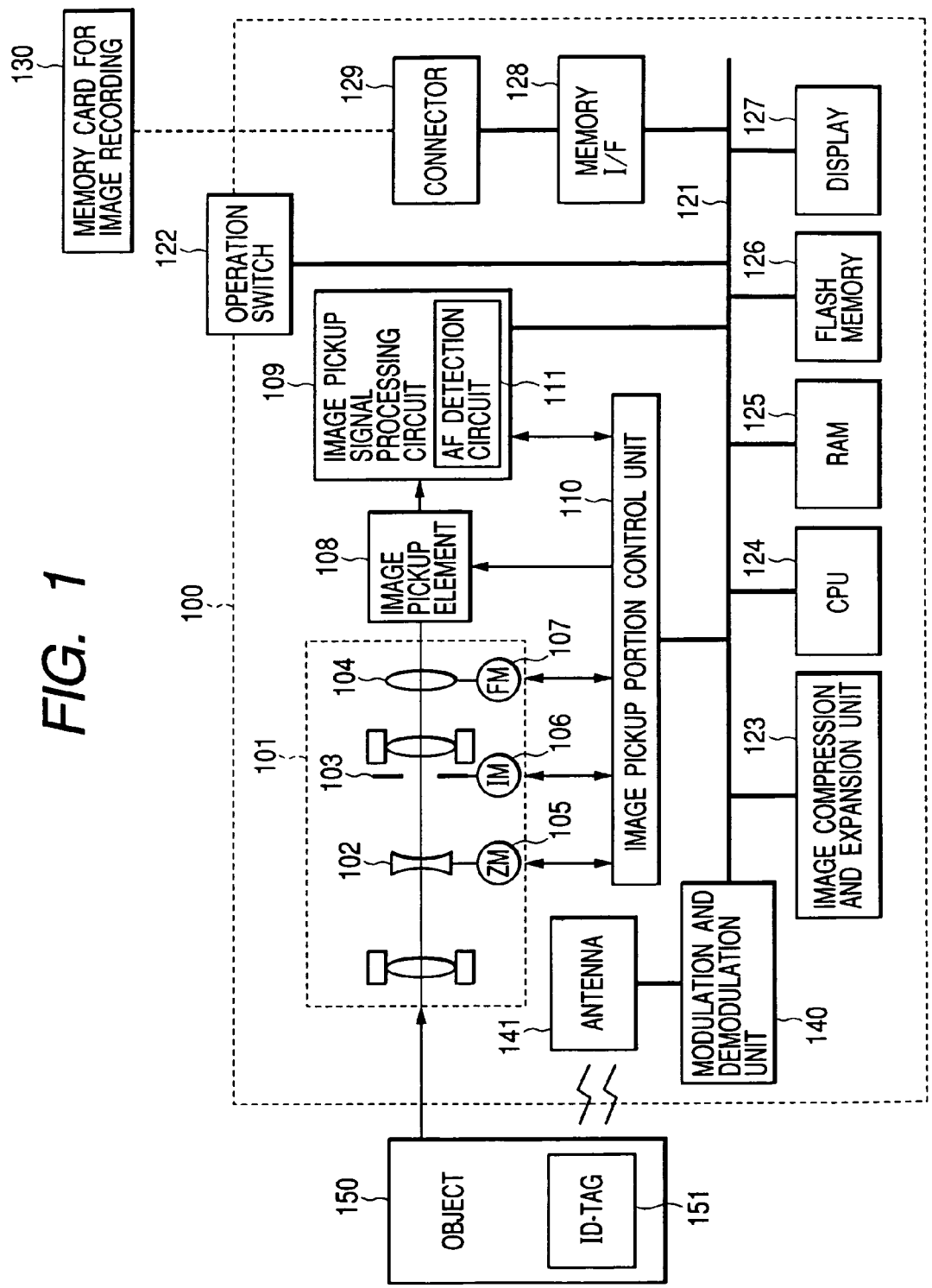
FIG. 1 is a block diagram showing a construction of an image pickup apparatus according to an embodiment of the invention.

FIG. 1 is a block diagram showing a construction of an image pickup apparatus 100 according to the embodiment. The image pickup apparatus is referred to as a camera in the following description.

In FIG. 1, each unit in the camera 100 is connected via a bus 121 and each unit is controlled by a CPU 124.

First, the operation of the camera 100 upon recording will be described. When the camera 100 is activated, a program stored in a flash memory 126 is loaded into a part of a RAM 125.

The CPU 124 operates in accordance with the program loaded into the RAM 125. The program can be executed in the flash memory 126.

A zoom lens 102, a zoom motor 105, an iris 103, an iris motor 106, a focusing lens 104, and a focusing motor 107 are included in a lens unit 101.

The zoom motor 105, iris motor 106, and focusing motor 107 in the lens unit 101, an image pickup element 108, an image pickup signal processing circuit 109, and an auto-focus detection circuit (AF detection circuit) 111 in the image pickup signal processing circuit 109 are controlled by an image pickup portion control unit 110 which is made operative by the control of the CPU 124.

The lens control operation of the image pickup portion control unit 110 will be described hereinbelow.

The image pickup portion control unit 110 makes AE adjustment for adjusting the iris 103 so as to optimize exposure of an image of an object 150. The image pickup portion control unit 110 makes auto-focus adjustment for adjusting the position of the focusing lens 104 by, for example, mountain climbing control so as to optimize the focus of the image of the object 150 by using an output from the AF detection circuit 111.

Further, the image pickup portion control unit 110 sets the position of the zoom lens 102 by driving the zoom motor 105 so as to obtain an angle of field which is set by a zoom switch (not shown) included in an operation switch 122. At this time, the zoom motor 105 returns a signal indicative of the position of the zoom lens 102 to the image pickup portion control unit 110.

The image pickup portion control unit 110 drives the focusing lens 104 by the focusing motor 107 in accordance with the auto-focus adjustment mentioned above, thereby optimizing the focus. At this time, the focusing motor 107 returns a signal indicative of the position of the focusing lens 104 to the image pickup portion control unit 110.

The image pickup portion control unit 110 drives the iris 103 by the iris motor 106 in accordance with the AE adjustment mentioned above, thereby adjusting the exposure. At this time, the iris motor 106 returns a signal indicative of a numerical aperture of the iris to the image pickup portion control unit 110.

The lens control operation is executed in this manner.

The image pickup operation will now be described.

Light from the object 150 passes through a lens group of the lens unit 101 and is formed as an image onto the image pickup element 108. The image formed on the image pickup element 108 is photoelectrically converted and read out as an electric signal.

The image pickup signal processing circuit 109 processes the image data generated from the image pickup element 108 and forms digital image data indicative of the motion image or the still image. The image pickup operation is executed in this manner.

When recording of the image is instructed by a recording start switch (not shown) included in the operation switch 122, the foregoing image pickup operation and lens control operation are executed. At the same time or before or after those operations, an electric power is supplied in a contactless manner via an antenna 141 to an ID-TAG 151 adhered or embedded to/into the object 150.

In the ID-TAG 151, by supplying the electric power thereto, an IC chip is activated and transmits information (object information) regarding the object 150. The antenna 141 receives the object information transmitted from the ID-TAG 151. The object information received by the antenna 141 is converted into digital data by a modulation and demodulation unit 140.

The object information converted into the digital data is temporarily stored into the RAM 125. If the ID-TAG 151 is of an electric power source built-in type, even if an electric power is not supplied from the antenna 141, the object information can be detected by the antenna 141.

An image compression and expansion unit 123 executes an image compression processing according to, for example, JPEG, MPEG, or the like to the image data of the photographed object 150 in accordance with a recording instruction. Thus, compression digital information (compression motion image or compression still image) is formed and temporarily stored into the RAM. 125.

The compressed motion image or the compressed still image is recorded into a memory card 130 for image recording via a memory interface (I/F) 128 and a connector 129. Although the image is recorded into the memory card 130 for image recording here, an arbitrary type of memory can be used as a memory card 130 for image recording. Further, the image can be also recorded into a random access media such as hard disk, optical disk, magnetooptic disk, magnetic tape, etc. instead of the memory card.

The object information obtained by the modulation and demodulation unit 140 is added as meta data to the picked-up image data and the resultant image data is recorded into the memory card 130 in parallel with the recording processing of the image data as mentioned above.

Besides the object information, thumbnail image data showing the photographed image, information showing the date and time of the photographing of the image, information showing the date and time of the recording of the image, a file name of the image, and the like are recorded as data which is added as meta data into the memory card 130.

Any information can be used as object information which is stored into the ID-TAG 151 so long as it is information regarding the object 150. For example, a kind of object 150, a manufacturing company of the object 150, a serial number to identify each object 150, performance or characteristics of the object 150, a past history of the object 150, manufacturing year/month/day of the object 150, a birthday, a term of appreciation, a term of use, and the like can be mentioned as examples of the object information.

Figure 2:
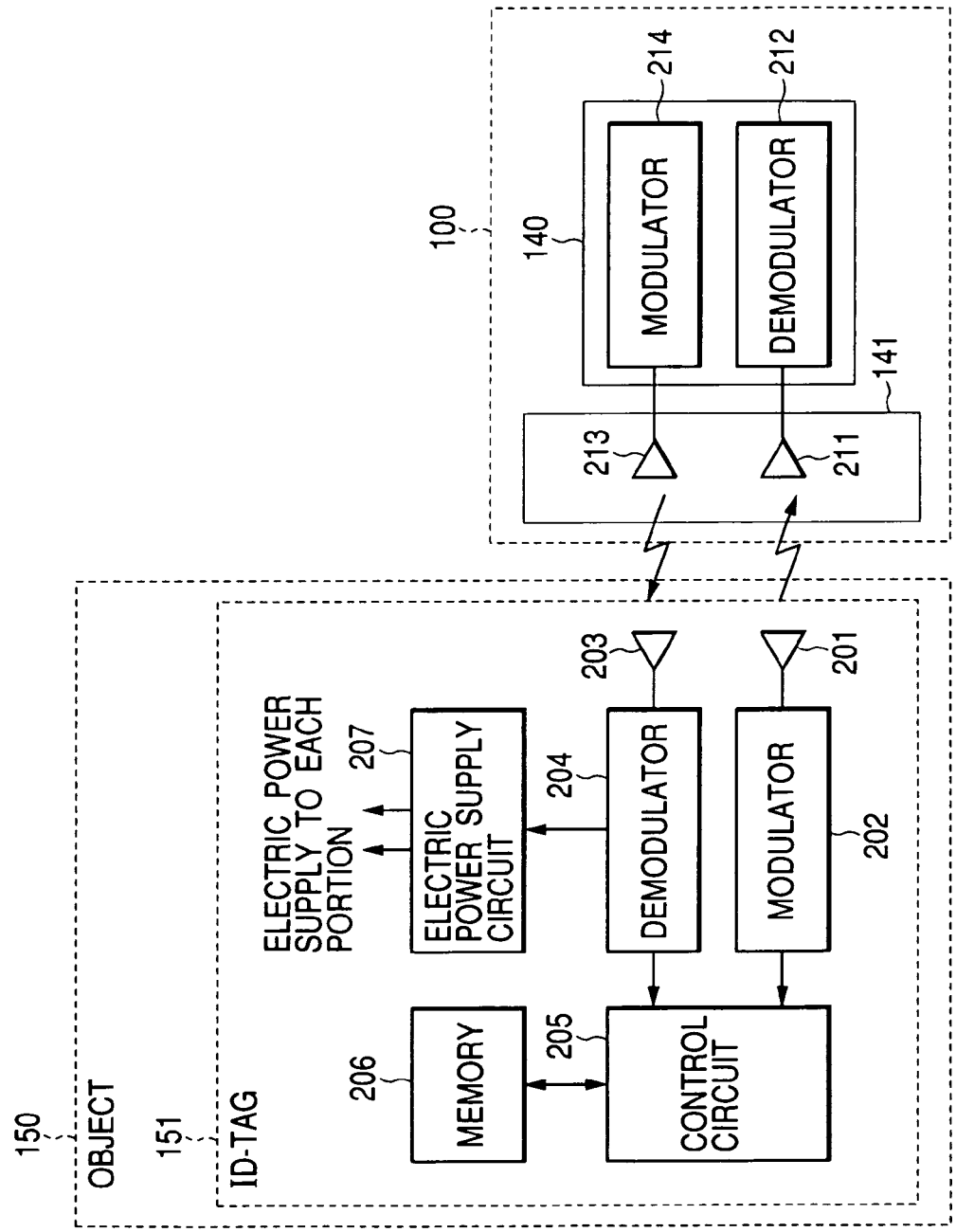
FIG. 2 is a block diagram showing an example of a specific construction of an ID-TAG and a communication unit of a camera in the embodiment of the invention.

FIG. 2 is a block diagram showing an example of a specific construction of the ID-TAG 151 adhered or embedded to/into the object 150 and a communication unit of the camera 100. In FIG. 2, a part of the construction included in the camera 100 is omitted.

Communication data is modulated by a modulator 214 in the modulation and demodulation unit 140 included in the main body of the camera 100. The modulated communication data is transmitted to the ID-TAG 151 of the object 150 via an antenna 213 in a wireless manner.

An antenna 203 on the ID-TAG 151 side receives the modulated communication data. The data is demodulated by a demodulator 204 and sent to a control circuit 205. The communication data which is sent from the control circuit 205 to the main body of the camera 100 is modulated by a modulator 202 on the ID-TAG 151 side and transmitted via an antenna 201 in a wireless manner.

The camera 100 receives the communication data transmitted from the ID-TAG 151 by an antenna 211 in a wireless manner, demodulates it by a demodulator 212, and transmits it to the CPU 124.

Prior to those wireless communicating operations, an electric power is supplied from the camera 100 to an electric power supply circuit 207 via the antenna 213 by electromagnetic induction. Thus, the electric power is supplied from the electric power supply circuit 207 to the whole ID-TAG 151.

The control circuit 205 communicates with the camera 100, at the same time, reads or writes the data from/into a memory 206, and transmits the data recorded in the memory 206 to the outside.

Figure 3:
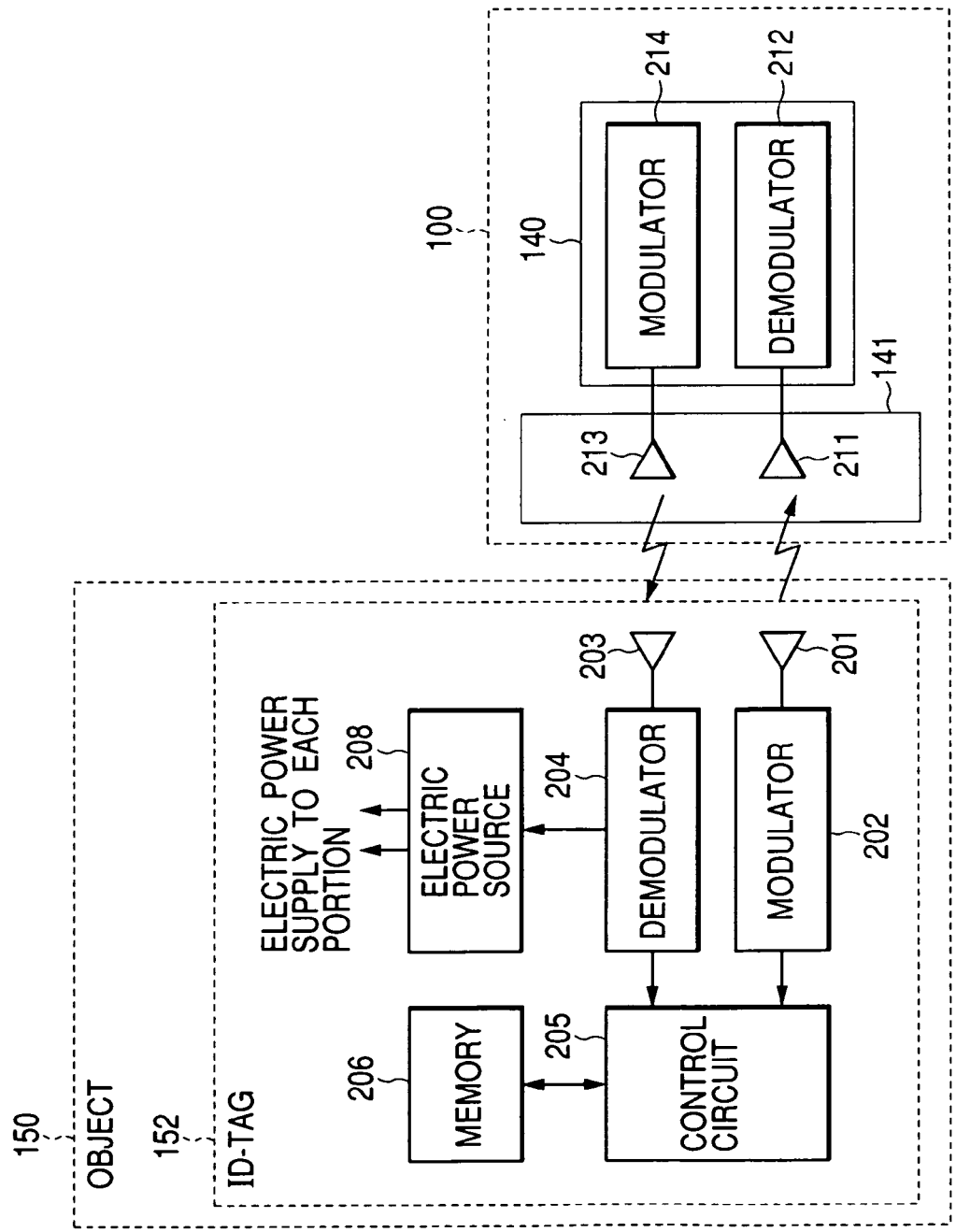
FIG. 3 is a block diagram showing an example of a specific construction of an ID-TAG and a communication unit of a camera in the embodiment of the invention.

FIG. 3 is a block diagram for explaining another type of the ID-TAG adhered or embedded to/into the object 150. In FIG. 3, the same portions as those in FIG. 2 are designated by the same reference numerals. Also in FIG. 3, a part of the construction included in the camera 100 is omitted.

An ID-TAG 152 shown in FIG. 3 is not the type in which the electric power is supplied from the antenna 203. That is, the ID-TAG 152 is a type in which an electric power source 208 such as a battery exists in the ID-TAG 152 and an electric power is supplied by the built-in electric power source 208 into the ID-TAG 152. The ID-TAG 152 has substantially the same construction and operates in the same manner as those of the ID-TAG 151 except that the electric power source is built in.

Directivity Control of an Antenna for Detecting the Object Information

Figure 4:
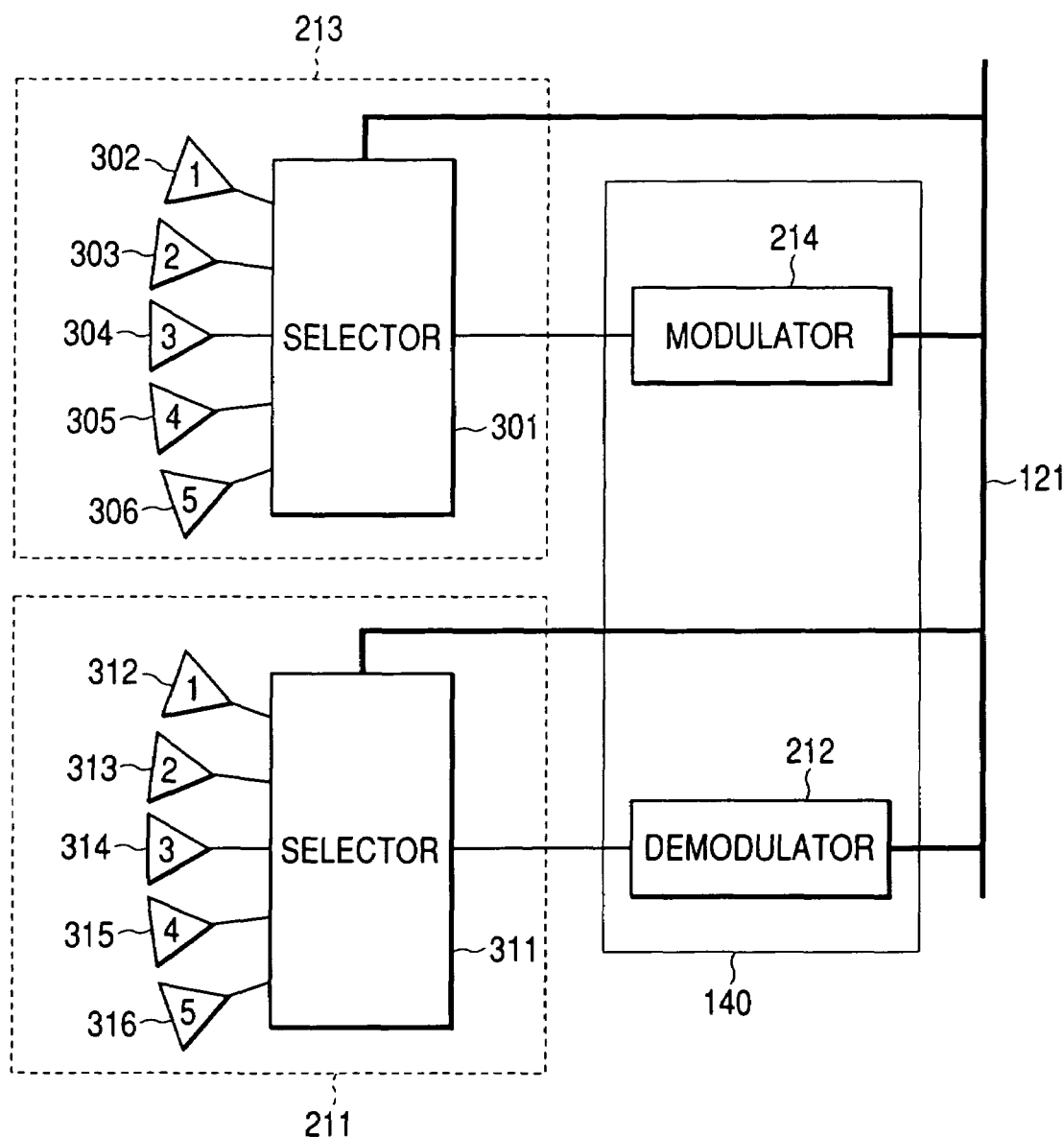
FIG. 4 is a block diagram showing an example of a specific construction of a transmitting antenna and a receiving antenna which are arranged in the communication unit of the camera in the embodiment of the invention.

FIG. 4 is a block diagram showing an example of a specific construction of the transmitting antenna 213 and the receiving antenna 211 which are arranged in the communication unit of the camera 100 described in FIGS. 2 and 3. Also in FIG. 4, a part of the construction included in the camera 100 is omitted.

In FIG. 4, the transmitting antenna 213 is constructed by a plurality of antennas 302 to 306 of different angles of directivity. By selecting one or a plurality of antennas 302 to 306 by a selector 301, the directivity to the object 150 can be changed.

The receiving antenna 211 is also similarly constructed by a plurality of antennas 312 to 316 of different angles of directivity. By selecting one or a plurality of antennas 312 to 316 by a selector 311, the directivity to the object 150 can be changed. The selectors 301 and 311 can select proper ones of the antennas 302 to 306 and 312 to 316 on the basis of an instruction which is transmitted from the CPU 124 via the bus 121.

Figure 5:
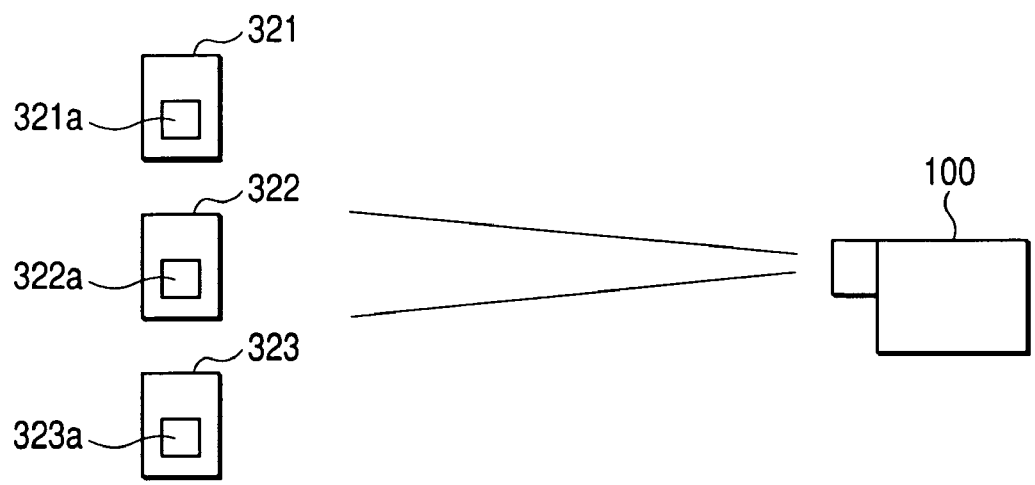
FIG. 5 is a diagram showing a photographing state in the embodiment of the invention.
Figure 6:
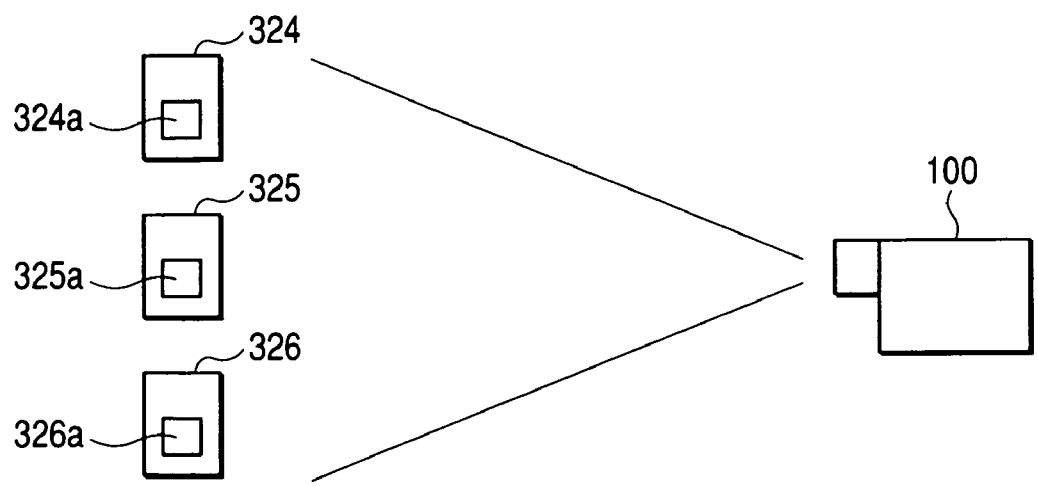
FIG. 6 is a diagram showing a photographing state in the embodiment of the invention.

FIGS. 5 and 6 are conceptual diagrams for explaining examples of the antenna selection processing for selecting the antennas 302 to 306 and 312 to 316 having the construction shown in FIG. 4.

FIG. 5 is the diagram showing the example in the case where a focal length of the zoom lens 102 arranged in the camera 100 is moved in the long direction and the angle of view upon photographing is narrowed, thereby photographing the object largely. In FIGS. 5 and 6, ID-TAGs 321a to 326a are adhered to objects 321 to 326, respectively.

Although the three objects 321, 322, and 323 exist in the example shown in FIG. 5, a target which is photographed is only the object 322. In this case, only the antenna 304 is selected by the selector 301 and only the antenna 314 is selected by the selector 311, thereby enabling the data to be transmitted and received in a narrow range. Thus, even if the plurality of objects 321, 322, and 323 exist, the camera 100 can communicate only with the ID-TAG 322a of the object 322 to be photographed.

FIG. 6 is a diagram showing the example in the case where a focal length of the zoom lens 102 arranged in the camera 100 is moved in the short direction, the angle of field upon photographing is widened, thereby photographing the plurality of objects 324, 325, and 326.

In this case, all of the antennas 302 to 306 are selected by the selector 301 and all of the antennas 312 to 316 are selected by the selector 311, thereby enabling the data to be transmitted and received in a wide range. Thus, the camera 100 can communicate with all of the plurality of objects 324, 325, and 326 and obtain the object information.

Detection of Object Information and Distance

Figure 7A:
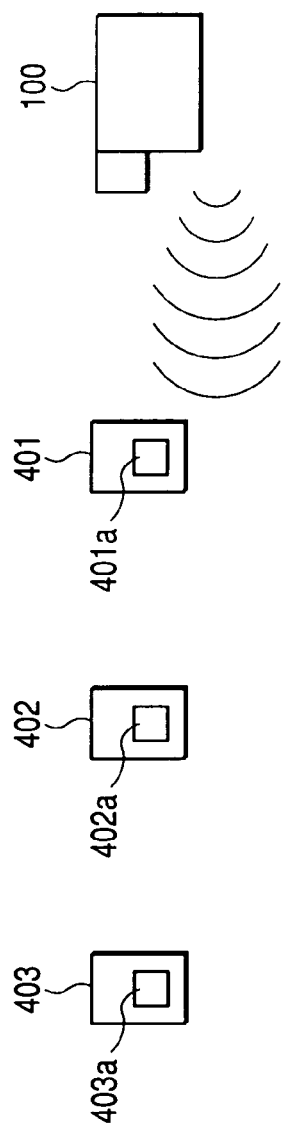
FIGS. 7A, 7B, and 7C are diagrams showing photographing states in the embodiment of the invention.
Figure 7B:
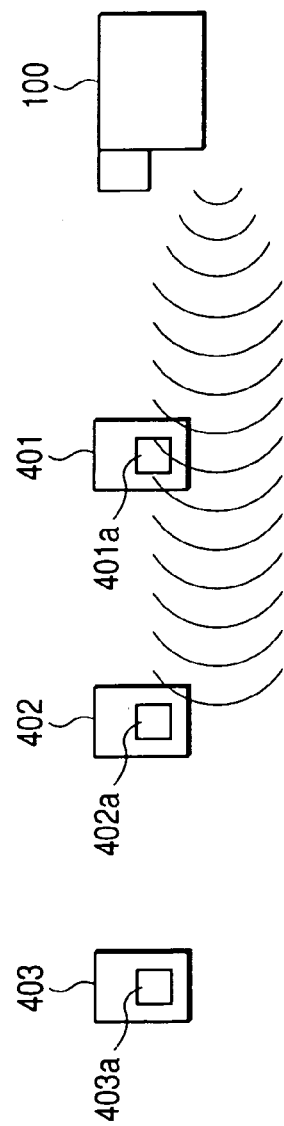
Figure 7C:
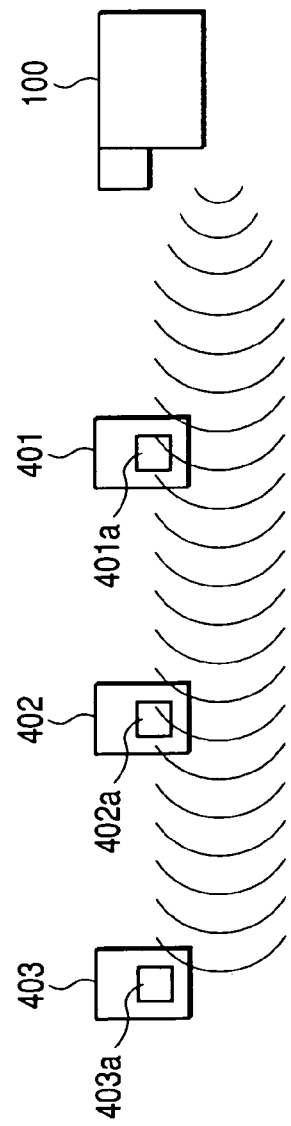

FIGS. 7A, 7B, and 7C are diagrams showing states in the case where strength of a radio wave (hereinafter, referred to as a field strength) which is transmitted from the camera 100 is changed and the objects of different distances are identified. In FIGS. 7A to 7C, ID-TAGs 401a to 403a are adhered to objects 401 to 403, respectively.

FIGS. 7A to 7C show examples in the case of identifying the three objects 401 to 403. The objects 401, 402, and 403 are arranged in order from the nearest position from the camera 100.

FIG. 7A shows the example in which the field strength of the radio wave which is transmitted from the camera 100 is weakened. In this case, the radio wave transmitted from the camera 100 just reaches only the object 401. Therefore, the camera 100 can read the object information of only the object 401.

FIG. 7B shows the example in which the field strength of the radio wave which is transmitted from the camera 100 is set to a middle value. In this case, the camera 100 can read the object information of the objects 401 and 402.

On the other hand, FIG. 7C shows the example in which the field strength of the radio wave which is transmitted from the camera 100 is set to the largest value. In this case, the camera 100 can read all of the object information of the three objects 401 to 403.

Therefore, by detecting the object information by gradually (step by step) raising the strength of the radio wave, the order relationship of the distances of the objects 401 to 403 can be grasped. Only the information of the object at a short distance can be extracted or only the information of the object at a long distance can be extracted.

Figure 8:
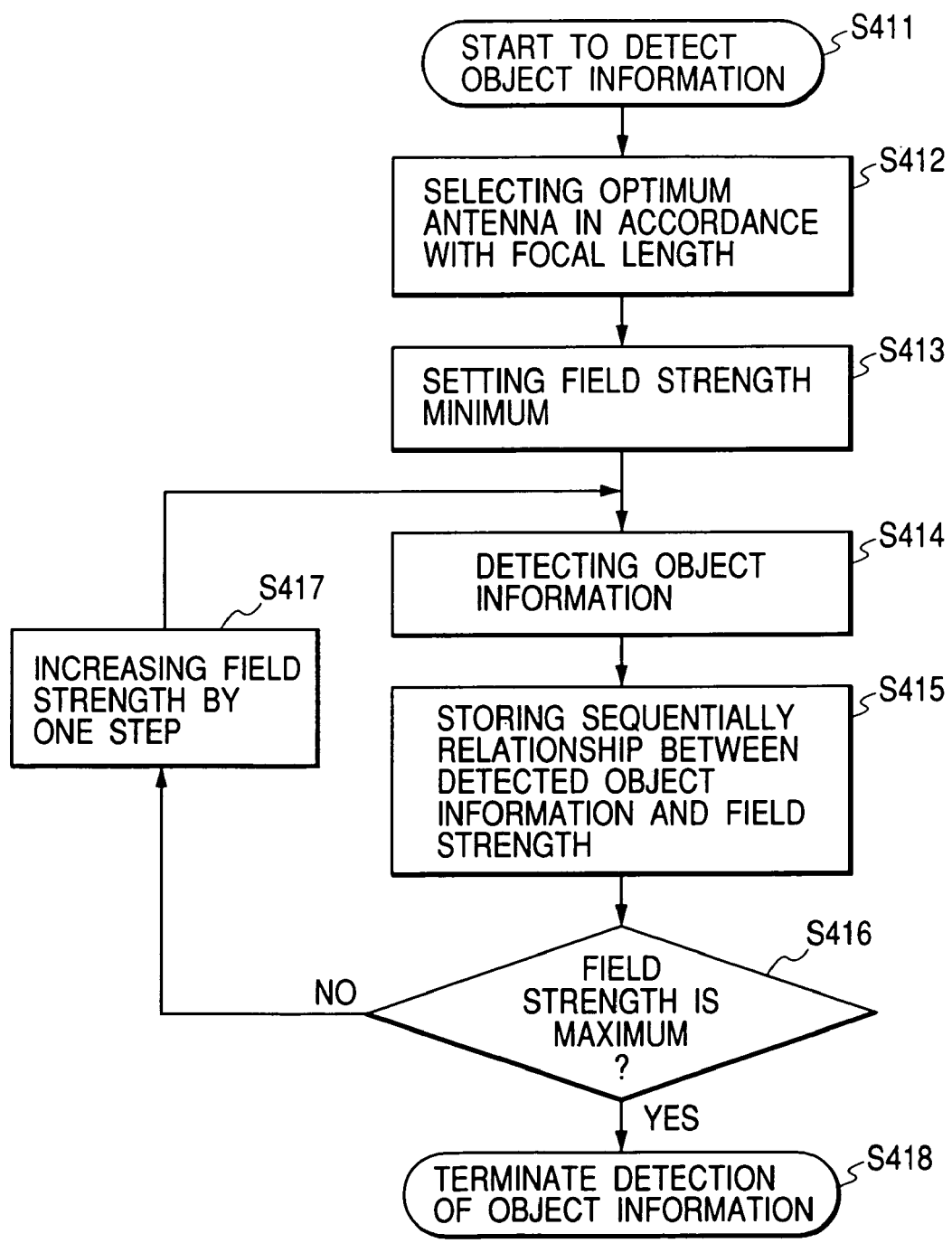
FIG. 8 is a flowchart for explaining a detection processing of object information in the embodiment of the invention.

FIG. 8 is a flowchart for explaining a processing of the camera 100 at the time of detecting the object information.

First, in step S411, the detection processing of the object information is started and the processing routine advances to step S412. In step S412, the image pickup portion control unit 110 obtains a focal length (=photographing angle of field) upon photographing by detecting position information of the zoom lens 102 as mentioned above.

The CPU 124 generates an antenna selection signal to the selectors 301 and 311 in accordance with the focal length obtained by the image pickup portion control unit 110. The selectors 301 and 311 select proper ones of the antennas 302 to 306 and 312 to 316 on the basis of the antenna selection signal. Thus, each of the antennas 302 to 306 and 312 to 316 is set to the angle directivity of communication that is optimum to the photographing focal length.

In next step S413, the CPU 124 sets the field strength of the radio wave which is used for communication with the object to the smallest value. Subsequently, in step S414, the apparatus actually communicates with the objects as mentioned above, thereby detecting the object information. In step S415, the CPU 124 stores a relationship between the object information detected in step S414 and the field strength into the RAM 125.

In step S416, the CPU 124 discriminates whether the present field strength reaches the maximum value in the target detecting range or not. If it is determined as a result of the discrimination that the present field strength does not reach the maximum value, step S417 follows and the field strength is increased by one step. The processings in step S414 and subsequent steps are repeated.

If the field strength has reached the maximum value in step S416, step S418 follows and the detection processing of the object information is terminated. Thus, the object information can be arranged in order from the nearest position from the camera 100 and stored into the RAM 125.

Photographing of Object

Figure 9:
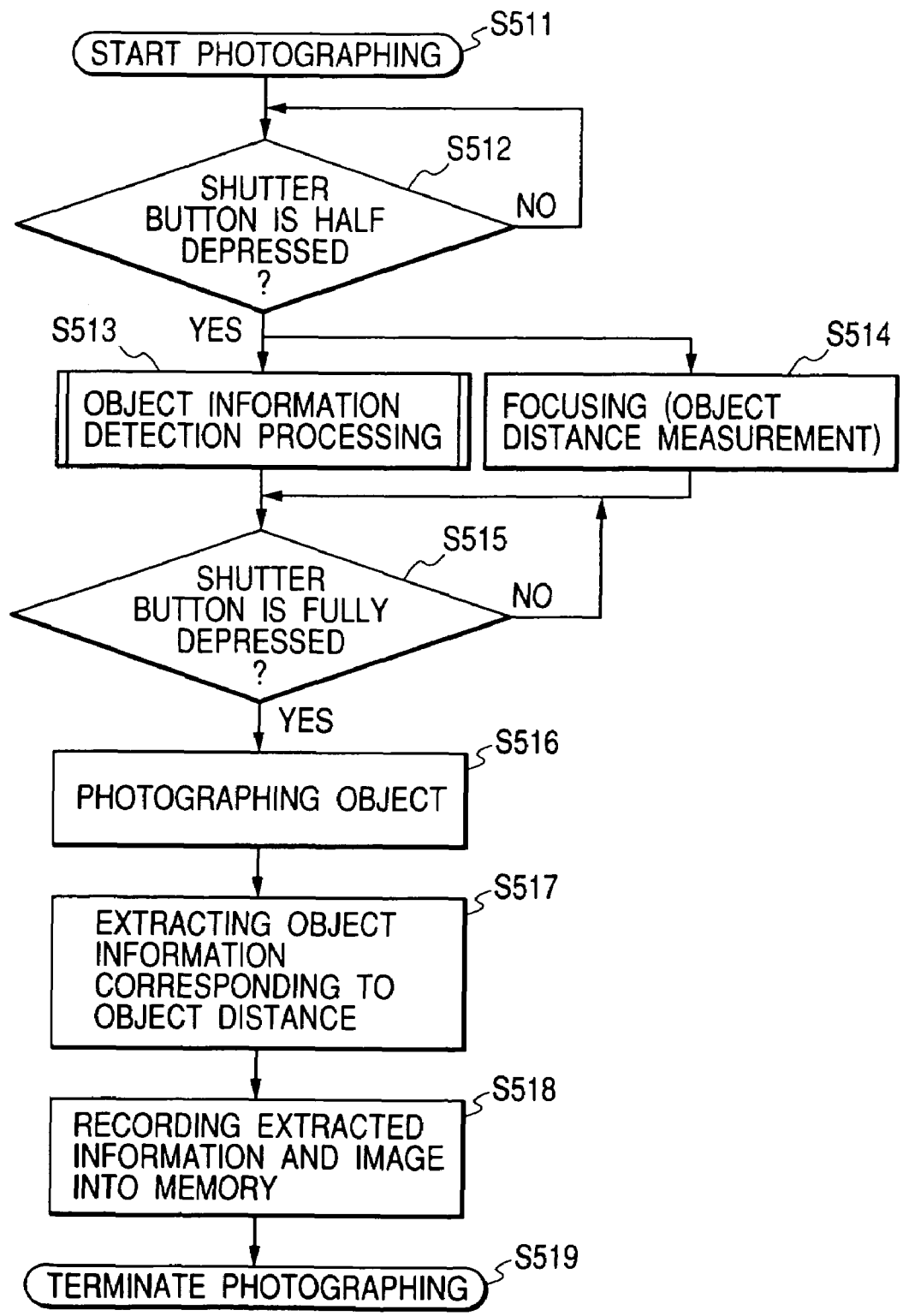
FIG. 9 is a flowchart for explaining the operation upon photographing in the embodiment of the invention.

FIG. 9 is a flowchart for explaining the operation of the camera 100 upon photographing of the objects in the embodiment.

In step S511, an object photographing processing is started and step S512 follows. In step S512, the CPU 124 discriminates whether a shutter button (not shown) included in the operation switch 122 is half depressed or not.

If the shutter button is not half depressed as a result of the discrimination, the processing in step S512 is repeated until the shutter button is half depressed. If it is determined that the shutter button is half depressed, the processing routine advances to steps S513 and S514.

In step S513, the object information detection processing described in conjunction with FIG. 8 is executed, thereby obtaining the object information according to the distance from the camera 100. At the same time, in step S514, the image pickup portion control unit 110 measures the distance to the object by using the AF detection circuit 111.

In step S515, the CPU 124 discriminates whether the shutter button is fully depressed or not. If the shutter button is not fully depressed as a result of the discrimination, the processing in step S515 is repeated until it is determined that the shutter button is fully depressed.

If it is determined that the shutter button is fully depressed, the processing routine advances to step S516 and the objects are photographed as mentioned above. The CPU 124 temporarily stores the photographed compressed image data into the RAM 125.

In step 517, the CPU 124 extracts only the object information corresponding to the distance measured in the processing of step S514 from the object information detected in the processing of step S513. In next step S518, the CPU 124 records the object information extracted in the processing of step S517 and the compressed image in the RAM 125 into the memory card 130 so as to correspond to each other. The photographing operation is terminated in step S519.

According to the embodiment as mentioned above, since the camera 100 obtains the object information from the ID-TAG 151 adhered to the object 150, upon photographing, the information regarding the object 150 can be promptly and certainly added as meta data to the image data of the object 150.

For example, in a group photograph or the like, if names, hometowns, birthdays, and the like of the photographed persons is specifically recorded as meta data, it is possible to easily, certainly, and electrically search for desired image data or distribute it later. If goods were photographed, a manufacturing company and contents of the goods can be electrically, easily, and certainly searched together with the image data of the goods.

In the case of photographing only one object 322 among the plurality of objects 321 to 323, the antennas 304 and 314 are selected by the selectors 301 and 311 and the data is transmitted and received in a narrow range. Therefore, the apparatus can communicate only with the ID-TAG 322a of the object 322 to be photographed. Thus, only the information regarding the object 322 can be obtained.

In the case of photographing the plurality of objects 324 to 326, all of the antennas 302 to 306 and 312 to 316 are selected by the selectors 301 and 311 and the data is transmitted and received in a wide range. Therefore, the apparatus can communicate with all of the ID-TAG 324a to 326a adhered to the plurality of objects 324 to 326. Thus, all of the information regarding the plurality of objects 324 to 326 can be obtained.

As mentioned above, when the ID-TAGs are detected, since the data is extracted only from the ID-TAG of the object to be photographed, only the information regarding the target object can be extracted.

Further, since the object information is obtained while gradually increasing the field strength of the radio wave which is transmitted from the camera 100 to the ID-TAGs 401a to 403a of the objects 401 to 403, the information of the plurality of objects 401 to 403 locating at different distances from the camera 100 can be identified. Thus, it is possible to extract only the information regarding the object 401 locating at a short distance from the camera 100, extract only the information regarding the object 403 locating at a long distance from the camera 100, or the like.

Second Embodiment

The second embodiment will now be described. The embodiment differs from the foregoing first embodiment with respect to only the photographing operation of the object and other construction and operation are similar to those in the first embodiment. Therefore, the same portions as those in the first embodiment are designated by the same reference numerals as those shown in FIGS. 1 to 9 and their detailed description is omitted here.

Figure 10:
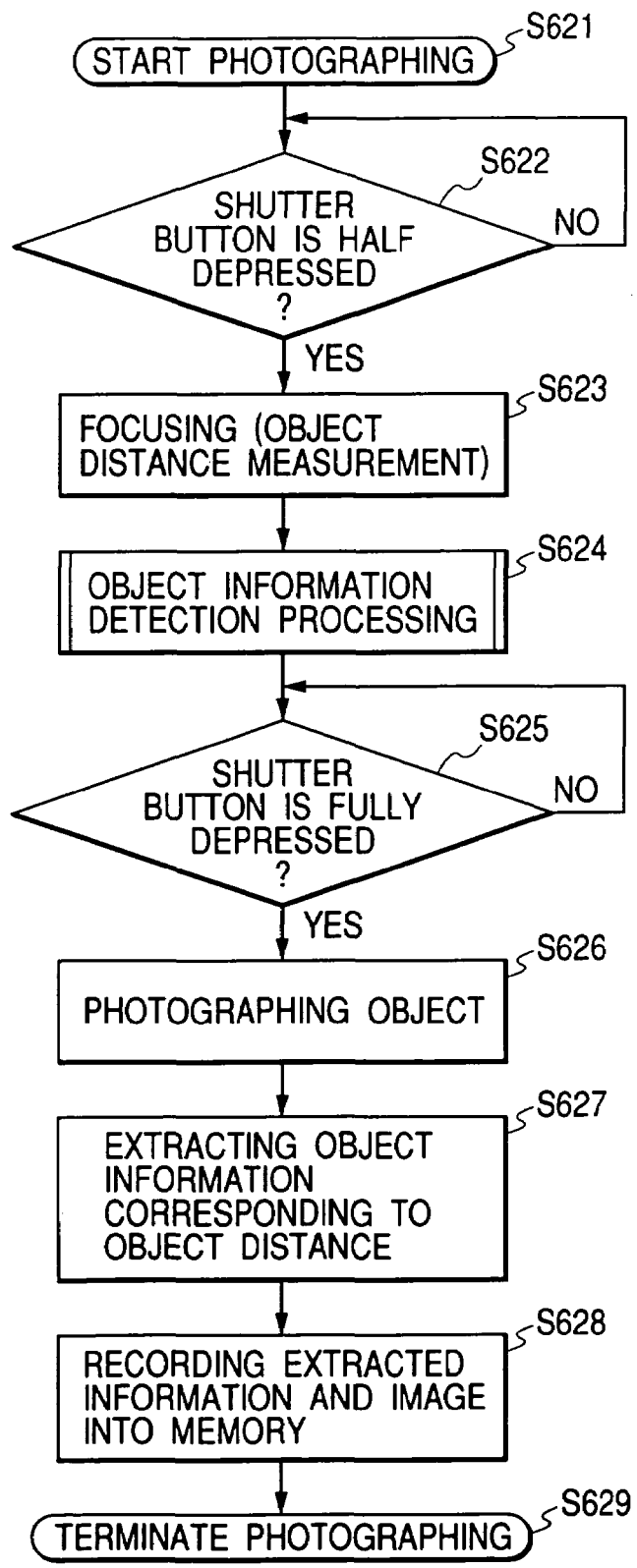
FIG. 10 is a flowchart for explaining the operation upon photographing in the embodiment of the invention.

FIG. 10 is a flowchart for explaining the operation of the camera upon photographing of the object in the embodiment.

In step S621, the photographing processing of the object is started and step S622 follows. In step S622, the CPU 124 discriminates whether the shutter button (not shown) included in the operation switch 122 is half depressed or not.

If the shutter button is not half depressed as a result of the discrimination, the processing in step S622 is repeated until the shutter button is half depressed. If it is determined that the shutter button is half depressed, the processing routine advances to step S623. The image pickup portion control unit 110 measures the distance to the object by using the AF detection circuit 111 of the camera 100.

In next step S624, the object information according to the distance from the camera is obtained in accordance with the object information detection processing in FIG. 8. At this time, by matching the maximum field strength with the object distance measured by the processing of step S623, the information of the object at the longest distance from the camera (that is, the object information detected finally) becomes the object information at the photographing distance.

Subsequently, in step S625, the CPU 124 discriminates whether the shutter button is fully depressed or not. If the shutter button is not fully depressed as a result of the discrimination, the processing in step S625 is repeated until it is decided that the shutter button is fully depressed.

If it is determined that the shutter button is fully depressed, the processing routine advances to step S626 and the objects are photographed as mentioned above. The photographed compression image data is temporarily stored into the RAM 125.

In step S627, only the information of the object at the longest distance from the camera is extracted from the object information detected in the processing of step S624. In next step S628, the object information extracted in the processing of step S627 and the compressed image data in the RAM 125 are recorded into the memory card 130 so as to correspond to each other. The photographing operation is terminated in step S629.

Since the maximum field strength is determined in accordance with the measured object distance as mentioned above in the second embodiment, in addition to the effect described in the first embodiment, there is technological advantages such that the object information can be more certainly obtained.

Third Embodiment

The third embodiment of the invention will now be described. The embodiment differs from the first embodiment with respect to only a part of the photographing operation of the object and other construction and operation are similar to those in the first embodiment. Therefore, the same portions as those in the first embodiment are designated by the same reference numerals as those shown in FIGS. 1 to 9 and their detailed description is omitted here.

Figure 11:
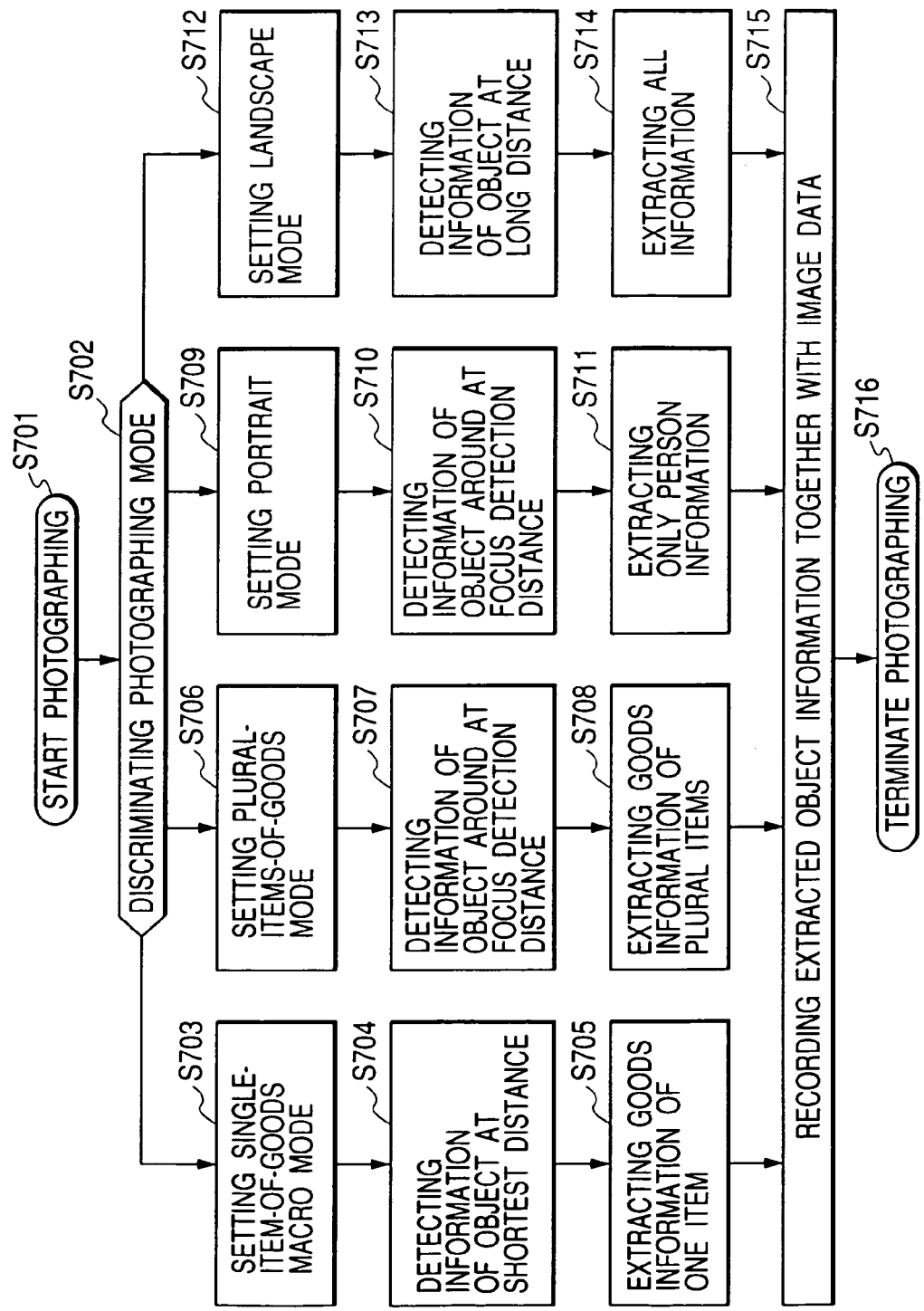
FIG. 11 is a flowchart for explaining the operation upon photographing in the embodiment of the invention.

In the third embodiment, upon photographing of the object, the object information is extracted in accordance with a photographing mode. The main operation of the camera upon photographing in the embodiment will now be described with reference to a flowchart of FIG. 11.

First, in step S701, the object photographing processing is started and step S702 follows. In step S702, the CPU 124 discriminates the photographing mode with reference to a switch position of a photographing mode switch (not shown) included in the operation switch 122.

If it is determined as a result of the discrimination that the switch position of the photographing mode switch is a goods macro mode, step S703 follows and the CPU 124 sets the photographing mode of the camera into the goods macro mode. The goods macro mode is a mode for enlarging an item of goods at a short distance in the macro mode and photographing it.

Therefore, in step S704, the information regarding the object at the shortest distance from the camera is detected by the processing in FIG. 8.

In next step S705, the CPU 124 extracts the object information regarding the goods by one from the object information detected in the processing of step S704. In step S715, the CPU 124 records the object information extracted in the processing of step S705 into the memory card 130 together with the compressed image data in a manner similar to the first embodiment. The photographing operation is terminated in step S716.

If it is decided in step S702 that the switch position of the photographing mode switch is a plural-items-of-goods mode, step S706 follows and the CPU 124 sets the photographing mode of the camera into the plural-items-of-goods mode. This plural-items-of-goods mode is a mode for photographing a plurality of goods at a normal distance.

In step S707, therefore, the object information of the object around at the short distance of the focus detection is detected in accordance with the algorithm for detecting the object information described by using FIG. 8.

Subsequently, in step S708, only the object information regarding the goods is extracted from a plurality of kinds of object information detected in the processing of step S707.

In step S715, the CPU 124 records the object information extracted in the processing of step S708 into the memory card 130 for image recording, together with the compressed image data in the RAM 125 as mentioned in the first embodiment. The photographing operation is terminated in step S716.

If it is determined in step S702 that the switch position of the photographing mode switch is a portrait mode, step S709 follows. The CPU 124 sets the photographing mode of the camera into the portrait mode. This portrait mode is a mode for photographing a person at a normal distance.

Therefore, in step S710, the object information of the object around at the focusing detection distance is detected in accordance with an algorithm to detect the object information described by using FIG. 8.

In next step S711, only the object information regarding the person is extracted from a plurality of object information detected by the processing of step S710.

In step S715, the CPU 124 records the object information extracted by the processing of step S711 into the memory card 130 for image recording, together with the compressed image data in the RAM 125 as mentioned in the first embodiment. The photographing operation is terminated in step S716.

Further, in step S702, if it is determined that in step S702 that the position of the photographing mode switch indicates a landscape mode, step S712 follows and the CPU 124 sets the photographing mode of the camera into the landscape mode. This landscape mode is a mode for photographing a landscape at a relatively long distance.

In step S713, therefore, the object information of the object at the relatively long distance that is farther than a predetermined distance is detected in accordance with the algorithm to detect the object described by using FIG. 8.

In next step S714, the CPU 124 extracts all of the object information detected by the processing of step S713. In step S715, the CPU 124 records the object information extracted by the processing of step S711 together with the compressed image data in the RAM 125 as mentioned in the first embodiment. The photographing operation is terminated in step S716.

Since only the optimum object information according to the position of the photographing mode switch is extracted in the embodiment as mentioned above, in addition to the technological advantages of the first and second embodiments, there is technological advantages such that the object information according to the purpose of the photographing can be more certainly obtained.

Fourth Embodiment

The fourth embodiment will now be described. The embodiment differs from the foregoing first embodiment with respect to only a part of the operation in "photographing of the object" and other construction and operation are similar to those in the first embodiment. Therefore, the same portions as those in the first embodiment are designated by the same reference numerals as those shown in FIGS. 1 to 9 and their detailed description is omitted here.

Figure 12:
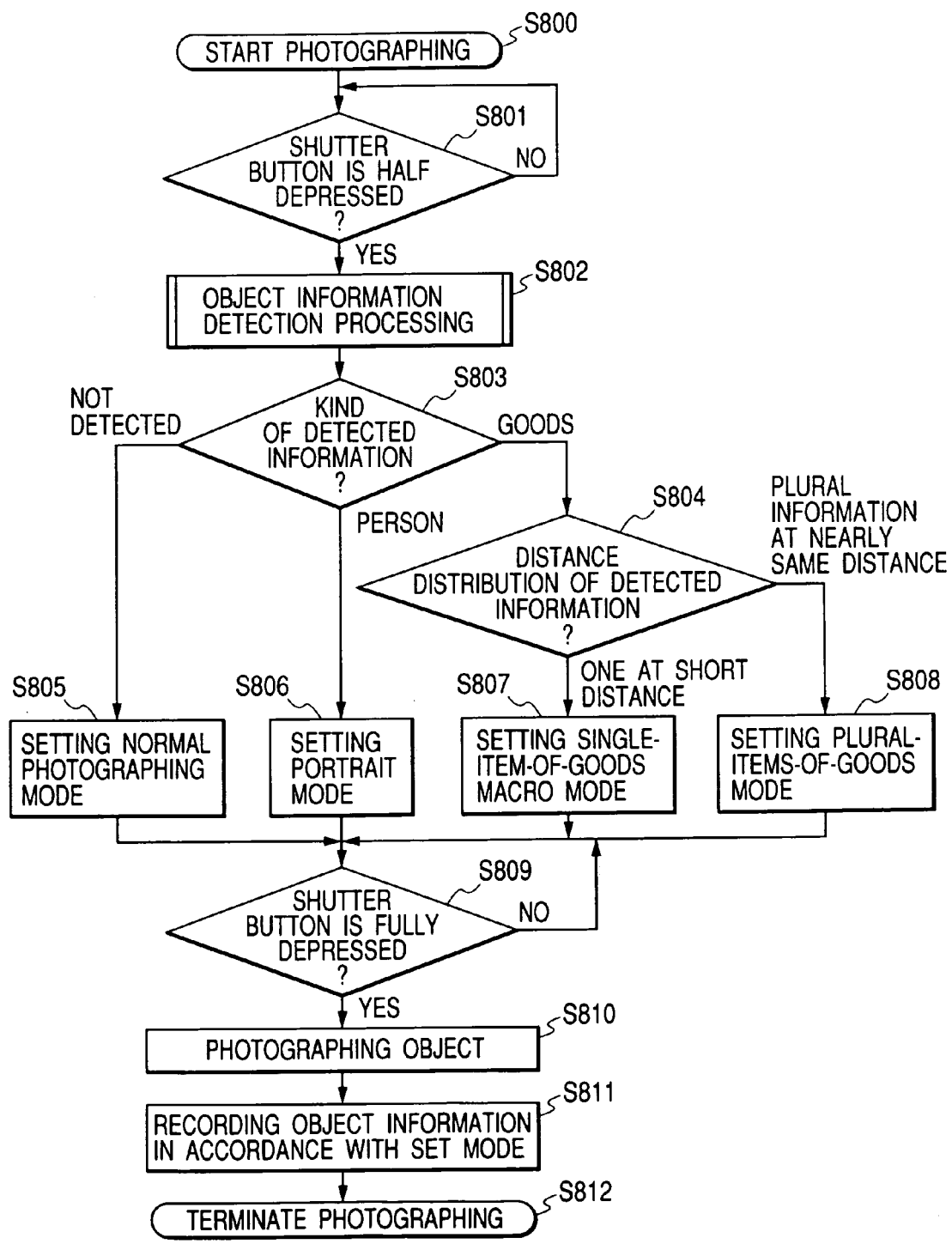
FIG. 12 is a flowchart for explaining the operation upon photographing in the embodiment of the invention.

In the fourth embodiment, when the object is photographed, the object information is detected, the photographing mode of the camera is automatically determined on the basis of the detected object information, and the object is photographed. The main operation of the camera upon photographing in the embodiment will now be described with reference to a flowchart of FIG. 12.

In step S800, the object photographing processing is started and step S801 follows. In step S801, the CPU 124 discriminates whether the shutter button (not shown) included in the operation switch 122 is half depressed or not.

If the shutter button is not half depressed as a result of the discrimination, the processing in step S801 is repeated until the shutter button is half depressed. If it is determined that the shutter button is half depressed, the processing routine advances to step S802.

In step S802, the object information is detected in accordance with the algorithm for detecting the object information described by using FIG. 8.

In next step S803, the kind of object information detected by the processing of step S802 is discriminated. In step S803, if the kind of object information detected in step S802 is not discriminated in particular or in the case where the kind cannot be classified because a plurality of kinds are detected, step S805 follows. In step S805, the CPU 124 sets the photographing mode of the camera into the normal photographing mode and the processing routine advances to step S809, which will be explained hereinlater.

If it is determined in step S803 that the kind of object information indicates a person, the CPU 124 sets the photographing mode of the camera into the portrait mode. In the portrait mode, an iris, a shutter speed, a distance range for focusing, and the like are set so as to optimize the photographing mode suitable for person photographing. After that, the processing routine advances to step S809, which will be explained hereinlater.

Further, if it is determined in step S803 that the kind of object information indicates goods, step S804 follows. In step S804, the CPU 124 discriminates distance distribution of the object information of the kind detected by the processing of step S802.

If it is determined as a result of the discrimination that the distance distribution of the object information is located at a short distance and there is only one object information at the short distance, the photographing mode of the camera into a single-item-of-goods macro mode. In the single-item-of-goods macro mode, the iris, the shutter speed, the distance range for focusing, and the like are set so as to optimize the photographing mode suitable for the macro photographing (magnified photographing). After that, the processing routine advances to step S809, which will be explained hereinlater.

If it is determined in step S804 that a plurality of distance distribution of the objects exist at a nearly same distance, step S808 follows and the CPU 124 sets the photographing mode of the camera into a plural-item-of-goods macro mode. In the plural-items-of-goods mode, the iris, the shutter speed, the distance range for focusing, and the like are set so as to optimize the photographing mode suitable for photographing a plurality of items of goods. After that, the processing routine advances to step S809.

In step S809, the CPU 124 discriminates whether the shutter button is fully depressed or not. If the shutter button is not fully depressed as a result of the discrimination, the processing in step S809 is repeated until it is determined that the shutter button is fully depressed. If it is determined that the shutter button is fully depressed, step S810 follows and the object is photographed in a manner similar to the foregoing first embodiment.

Subsequently, in step S811, the object information is recorded as meta data of the image photographed by the processing of step S810 in accordance with the photographing mode of the camera which is set in each of steps S805 to S808.

In the normal photographing mode, all of the detected object IDs are recorded as meta data. In the portrait mode, only the object information of the person is recorded as meta data. In the single-item-of-goods macro mode, only the object information regarding the item of goods at the shortest distance is recorded as meta data. In the plural-items-of-goods mode, the object information of a plurality of items of goods is recorded as meta data. After completion of the recording of the object information as mentioned above, the photographing operation is terminated in step S812.

Since the photographing mode of the camera is set on the basis of the detected kind of object information as mentioned above in the embodiment, in addition to the effects of the first to third embodiments mentioned above, there are technological advantages such that the optimum photographing can be performed in accordance with the kind of object to be photographed and the object information suitable for the photographing contents can be added as meta data.

Other Embodiments of the Invention

The invention also incorporates a case where so as to make various devices operative in order to realize the functions of the embodiments mentioned above, program codes of software for realizing the functions of the embodiments mentioned above are supplied to a computer in an apparatus or a system connected to the various devices and the various devices are made operative in accordance with the program stored in the computer (a CPU or an MPU) of the system or the apparatus, thereby embodying them.

In such a case, the program codes themselves of the software realize the functions of the embodiments mentioned above and the program codes themselves and means for supplying the program codes to the computer, for example, the recording medium in which the program codes is stored construct the invention. For example, a flexible disk, a hard disk, an optical disk, a magnetooptic disk, a CD-ROM, a magnetic tape, a non-volatile memory card, a ROM, or the like can be used as a recording medium for storing the program codes.

The program codes are incorporated in the embodiments of the invention not only in the case where the computer executes the supplied program codes, so that the functions of the embodiments mentioned above are realized but also in the case where the program codes realize the functions of the embodiments mentioned above in cooperation with an OS (Operating System) which is operating in the computer, another application software, or the like.

Further, the invention incorporates a case where the supplied program codes are stored into a memory provided for a function expanding board of a computer or a function expanding unit connected to a computer and, thereafter, a CPU or the like provided for the function expanding board or the function expanding unit executes a part or all of actual processes on the basis of instructions of the program codes and the functions of the embodiments mentioned above are realized by those processes.

Many widely different embodiments of the present invention may be constructed without departing from the spirit and scope of the present invention. It should be understood that the present invention is not limited to the specific embodiments described in the specification, except as defined in the appended claims.

What is claimed is:

1. An imaging apparatus comprising:

image pickup means for picking up an image of an object, said image pickup means including object distance detecting means for detecting an object distance as a distance to the object and picking up the image of the object in accordance with the object distance;

information detecting means for reading, in a contactless manner, object information regarding the object from a contactless ID tag by transmitting a radio wave toward the object, said information detecting means reading from the objects of different object distance by changing a power of the radio wave which is transmitted toward the object; and recording means for selecting the object information of the object distance detected by said object distance detecting means from the object information read by said information detecting means according to the object distance detected by the object distance detecting means and for recording the selected object information onto a recording medium together with image data of the object picked up by said image pickup means.

2. An image pickup apparatus comprising:

image pickup means for picking up an image of an object, said image pickup means having a plurality of photographing modes, said image pickup means picking up the image in each of the plurality of photographing modes;

information detecting means for reading, in a contactless manner, object information regarding the object from a contactless ID tag;

recording means for recording the object information detected by said information detecting means onto a recording medium together with image data of the object picked up by said image pickup means;

mode selecting means for selecting a photographing mode from the plurality of photographing modes; and control means for changing a reading operation of the object information by said information detecting means in accordance with the photographing mode selected by said mode selecting means.

3. An apparatus according to claim 2, wherein when a macro mode is selected by said mode selecting means, said control means controls said information detecting means so as to read only the object information regarding the object at a shortest distance.

4. An apparatus according to claim 2, wherein when a landscape mode is selected by said mode selecting means, said control means controls said information detecting means so as to detect only the object information regarding the object at a distance which is farther than a predetermined distance.

5. An apparatus according to claim 2, wherein when a goods photographing mode is selected by said mode selecting means, said control means controls said information detecting means so as to detect only the object information of goods.

6. An apparatus according to claim 2, wherein when a person photographing mode is selected by said mode selecting means, said control means controls said information detecting means so as to detect only the object information of a person.

7. An image pickup apparatus comprising:

image pickup means for picking up an image of an object, said image pickup means having a plurality of photographing modes, said image pickup means picking up the image in each of the plurality of photographing modes;

information detecting means for detecting, in a contactless manner, object information regarding the object stored in a contactless ID tag;

recording means for recording the object information detected by said information detecting means onto a recording medium together with image data of the object picked up by said image pickup means; and control means for selecting a mode suitable for photographing the object from the plurality of photographing modes on the basis of the object information detected by said information detecting means.

8. An apparatus according to claim 7, wherein said control means presumes the object on the basis of the object information detected by said information detecting means and sets the mode of said image pickup means into a mode suitable for photographing said presumed object.

* * * * *